United States Patent
Nomura et al.

(10) Patent No.: US 12,111,494 B2
(45) Date of Patent: Oct. 8, 2024

(54) OPTICAL FIBER AND METHOD FOR MANUFACTURING OPTICAL FIBER

(71) Applicant: SUMITOMO ELECTRIC INDUSTRIES, LTD., Osaka (JP)

(72) Inventors: Takahiro Nomura, Osaka (JP); Kazuyuki Sohma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 194 days.

(21) Appl. No.: 17/789,287

(22) PCT Filed: Aug. 31, 2021

(86) PCT No.: PCT/JP2021/031878
§ 371 (c)(1),
(2) Date: Jun. 27, 2022

(87) PCT Pub. No.: WO2022/050257
PCT Pub. Date: Mar. 10, 2022

(65) Prior Publication Data
US 2023/0042395 A1   Feb. 9, 2023

(30) Foreign Application Priority Data
Sep. 4, 2020 (JP) .................. 2020-148903

(51) Int. Cl.
*G02B 6/122* (2006.01)
(52) U.S. Cl.
CPC ................ *G02B 6/1221* (2013.01)

(58) Field of Classification Search
None
See application file for complete search history.

(56) References Cited

U.S. PATENT DOCUMENTS

| | | | |
|---|---|---|---|
| 2009/0123749 A1 | 5/2009 | Ui et al. | |
| 2015/0131956 A1* | 5/2015 | Iwaguchi | G02B 6/03694 385/128 |
| 2017/0242209 A1 | 8/2017 | Tachibana et al. | |

(Continued)

FOREIGN PATENT DOCUMENTS

| | | |
|---|---|---|
| JP | H10-059748 A | 3/1998 |
| JP | 2006-308780 A | 11/2006 |

(Continued)

*Primary Examiner* — Chad H Smith
(74) *Attorney, Agent, or Firm* — Faegre Drinker Biddle & Reath LLP

(57) ABSTRACT

An optical fiber includes a glass fiber including: a core and a cladding; and a coating resin layer coating the glass fiber in contact with the glass fiber; wherein the coating resin layer has a primary resin layer coating the glass fiber in contact with the glass fiber and a secondary resin layer coating the primary resin layer, the primary resin layer contains a cured product of a first resin composition containing a photopolymerizable compound and a phosphine oxide-based photopolymerization initiator, the secondary resin layer contains a cured product of a second resin composition containing a photopolymerizable compound and a phosphine oxide-based photopolymerization initiator, and an amount of the phosphine oxide-based photopolymerization initiator remaining unreacted in the coating resin layer is 0.5 mass % or less.

9 Claims, 1 Drawing Sheet

(56) References Cited

U.S. PATENT DOCUMENTS

| | | | |
|---|---|---|---|
| 2017/0307814 | A1 | 10/2017 | Tachibana et al. |
| 2018/0128970 | A1 | 5/2018 | Homma et al. |
| 2018/0282208 | A1 | 10/2018 | Sato et al. |
| 2019/0338161 | A1 | 11/2019 | Botelho et al. |

FOREIGN PATENT DOCUMENTS

| | | | |
|---|---|---|---|
| JP | 2007-256609 | A | 10/2007 |
| JP | 2014-118318 | A | 6/2014 |
| JP | 2016-070966 | A | 5/2016 |
| JP | 2018-077303 | A | 5/2018 |
| JP | 2018-177630 | A | 11/2018 |
| JP | 2019-061157 | A | 4/2019 |
| WO | WO-2014/168201 | A1 | 10/2014 |
| WO | WO-2016/059727 | A1 | 4/2016 |
| WO | WO-2019/138968 | A1 | 7/2019 |

\* cited by examiner

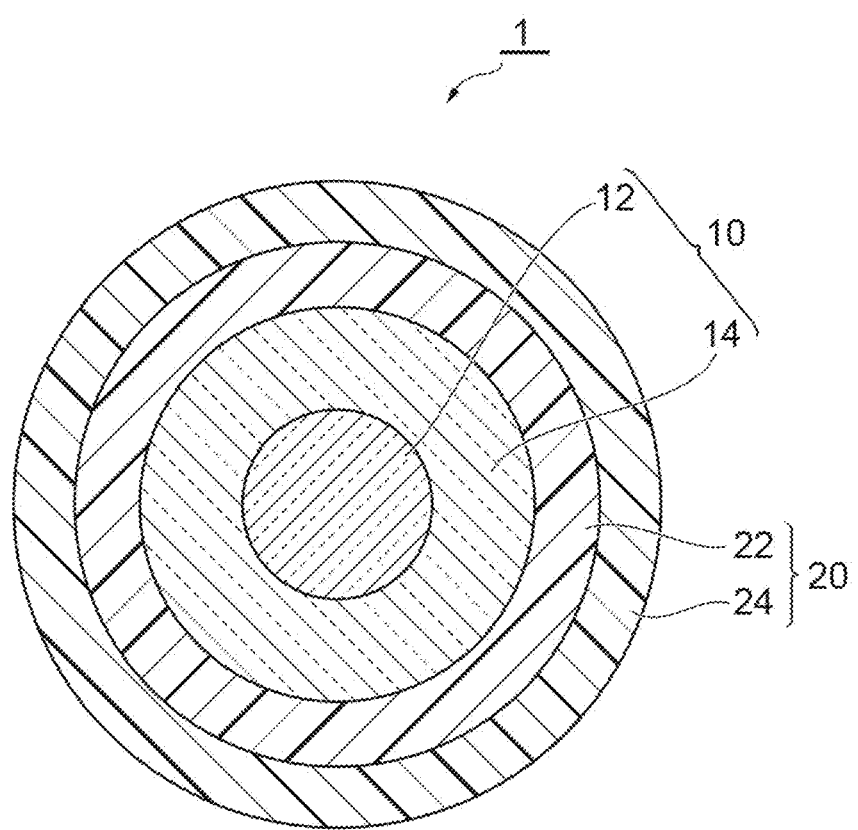

OPTICAL FIBER AND METHOD FOR MANUFACTURING OPTICAL FIBER

TECHNICAL FIELD

The present disclosure relates to an optical fiber and a method for manufacturing the optical fiber.

The present application claims priority to Japanese Patent Application No. 2020-148903 filed on Sep. 4, 2020, the content of which is incorporated herein entirely by reference.

BACKGROUND ART

Ordinarily, an optical fiber comprises a coating resin layer for protecting a glass fiber, which is an optical transmission medium. The coating resin layer is composed of, for example, two layers of a primary resin layer in contact with the glass fiber and a secondary resin layer formed as an outer layer of the primary resin layer.

In the case of connecting an optical fiber, there is a need to remove a part of the coating resin layer from the glass fiber. Patent Literature 1 discloses adjusting the removability of the coating resin layer with attention paid to the contact angle of mineral oil on the primary resin layer and the elastic modulus of the secondary resin layer.

CITATION LIST

Patent Literature

Patent Literature 1: JP 2019-61157 A

SUMMARY OF INVENTION

An optical fiber according to an aspect of the present disclosure comprises: a glass fiber including a core and a cladding; and a coating resin layer coating the glass fiber in contact with the glass fiber; wherein the coating resin layer has a primary resin layer coating the glass fiber in contact with the glass fiber and a secondary resin layer coating the primary resin layer, the primary resin layer comprises a cured product of a first resin composition containing a photopolymerizable compound and a phosphine oxide-based photopolymerization initiator, the secondary resin layer comprises a cured product of a second resin composition containing a photopolymerizable compound and a phosphine oxide-based photopolymerization initiator, and an amount of the phosphine oxide-based photopolymerization initiator remaining unreacted in the coating resin layer is 0.5 mass % or less.

BRIEF DESCRIPTION OF DRAWING

FIG. 1 is a schematic cross-sectional view showing an example of an optical fiber according to the present embodiment.

DESCRIPTION OF EMBODIMENT

Problem to be Solved by Present Disclosure

When an optical fiber is exposed to light from a fluorescent lamp or the like, a curing reaction of a coating resin layer may progress over time so that the adhesive force of the coating resin layer to a glass fiber becomes too high. If the adhesion of the coating resin layer to the glass fiber becomes too high, a part of the coating resin layer may remain on the outer circumference of the glass fiber when the coating resin layer is removed from the glass fiber.

An objective of the present disclosure is to provide an optical fiber in which a change in the removability of the coating over time is reduced and a method for manufacturing the optical fiber.

Effect of Present Disclosure

According to the present disclosure, it is possible to provide an optical fiber in which a change in the removability of the coating over time is reduced and a method for manufacturing the optical fiber.

DESCRIPTION OF EMBODIMENT OF PRESENT DISCLOSURE

First, the content of an embodiment of the present disclosure will be listed and described. An optical fiber according to an aspect of the present disclosure comprises a glass fiber including a core and a cladding and a coating resin layer coating the glass fiber in contact with the glass fiber. The coating resin layer has a primary resin layer coating the glass fiber in contact with the glass fiber and a secondary resin layer coating the primary resin layer. The primary resin layer comprises a cured product of a first resin composition containing a photopolymerizable compound and a phosphine oxide-based photopolymerization initiator, and the secondary resin layer comprises a cured product of a second resin composition containing a photopolymerizable compound and a phosphine oxide-based photopolymerization initiator. The amount of the phosphine oxide-based photopolymerization initiator remaining unreacted in the coating resin layer is 0.5 mass % or less.

In a case where an optical fiber is exposed to light from a fluorescent lamp or the like, an unreacted photopolymerization initiator contained in a coating resin layer is cleaved to allow the curing of the coating resin layer progress, and it becomes difficult to remove the coating resin layer from a glass fiber. In particular, since the phosphine oxide-based photopolymerization initiator has high reactivity, it is important to reduce the amount of the unreacted phosphine oxide-based photopolymerization initiator in the coating resin layer. The optical fiber according to the present embodiment is capable of reducing a change in the removability of the coating over time.

The second resin composition may further contain an acetophenone-based photopolymerization initiator in view of improving the curability of the surface. The first resin composition and the second resin composition may not contain any photopolymerization initiators other than the phosphine oxide-based photopolymerization initiator in view of cutting the cost of the resin compositions.

In view of further reducing the change in the removability of the coating over time, at least one of the first resin composition or the second resin composition may contain, as the photopolymerizable compound, nonylphenol polyethylene glycol acrylate, and the amount of the nonylphenol polyethylene glycol acrylate remaining unreacted in the coating resin layer may be less than 1.0 mass %.

A method for manufacturing the optical fiber according to the present embodiment includes an application step of applying the first resin composition and the second resin composition to a glass fiber having a temperature of 80° C. or lower such that the first resin composition and the second resin composition are distant from the glass fiber in this order, and a curing step of curing the resin compositions by radiating ultraviolet rays after the application step. When the temperature of the glass fiber immediately before applying the resin compositions to the glass fiber is set to 80° C. or lower, it is easy to reduce the proportion of the unreacted phosphine oxide-based photopolymerization initiator, and it is thus possible to suppress the progress of the curing of the coating resin layer over time.

In the curing step, ultraviolet rays emitted by an ultraviolet light emitting diode (ultraviolet LED) may be radiated. In such a case, it is thus possible to further reduce the proportion of the unreacted phosphine oxide-based photopolymerization initiator.

The wavelengths of the ultraviolet rays may be within a region of 350 nm to 405 nm in view of curing the coating resin layer up to the inside in the curing step.

Detail of Embodiment of Present Disclosure

Specific examples of the optical fiber and the method for manufacturing the same according to the present embodiment will be described with reference to a drawing as necessary. The present disclosure is not limited to these examples and is shown by the claims and intended to include equivalent meaning to the claims and all modifications within the scope. In the following description, the same element will be given the same reference sign in the description for the drawing and will not be described again.

(Optical Fiber)

FIG. 1 is a cross-sectional view showing the configuration of an optical fiber according to an embodiment. In FIG. 1, a cross section perpendicular to the central axis direction (optical axis direction) of an optical fiber 1 is shown. As shown in FIG. 1, the optical fiber 1 of the present embodiment comprises a glass fiber 10, which is an optical transmission medium, and a coating resin layer 20 coating the glass fiber 10 in contact with the glass fiber 10.

The glass fiber 10 includes a core 12 and a cladding 14 covering the core 12. The glass fiber 10 is a glass member and made of, for example, silica ($SiO_2$) glass. The glass fiber 10 transmits light introduced into the optical fiber 1. The core 12 is provided in, for example, a region including the central axis line of the glass fiber 10. The core 12 is made of, for example, pure $SiO_2$ glass, or $SiO_2$ glass doped with $GeO_2$, a fluorine element and/or the like. The cladding 14 is provided in a region surrounding the core 12. The cladding 14 has a refractive index lower than the refractive index of the core 12. The cladding 14 is made of, for example, pure $SiO_2$ glass or $SiO_2$ glass doped with a fluorine element.

The coating resin layer 20 is an ultraviolet-curable resin layer covering the cladding 14. The coating resin layer 20 includes a primary resin layer 22 coating the outer circumference of the glass fiber 10 and a secondary resin layer 24 coating the outer circumference of the primary resin layer 22. The primary resin layer 22 is in contact with the outer circumferential surface of the cladding 14 and coats the entire cladding 14. The secondary resin layer 24 is in contact with the outer circumferential surface of the primary resin layer 22 and coats the entire primary resin layer 22. The thickness of the primary resin layer 22 is, for example, 10 μm or more and 50 μm or less. The thickness of the secondary resin layer 24 is, for example, 10 μm or more and 40 μm or less. The coating resin layer 20 may further include a coloring resin layer coating the outer circumference of the secondary resin layer 24.

The primary resin layer 22 contains a cured product of the first resin composition containing a photopolymerizable compound and a phosphine oxide-based photopolymerization initiator. The secondary resin layer 24 contains a cured product of the second resin composition containing a photopolymerizable compound and a phosphine oxide-based photopolymerization initiator. The amount of the unreacted phosphine oxide-based photopolymerization initiator in the coating resin layer 20 is 0.5 mass % or less. Therefore, it is possible to reduce a change in the removability of the coating over time in the optical fiber. The amount of the unreacted phosphine oxide-based photopolymerization initiator is preferably 0.49 mass % or less, more preferably 0.48 mass % or less and still more preferably 0.45 mass % or less. The lower limit value of the amount of the unreacted phosphine oxide-based photopolymerization initiator is not particularly limited, and the amount may be 0.01 mass % or more, 0.03 mass % or more or 0.05 mass % or more.

Examples of the phosphine oxide-based photopolymerization initiator include 2,4,6-trimethylbenzoyldiphenylphosphine oxide (Omnirad TPO, manufactured by IGM Resins B.V.), bis(2,4,6-trimethylbenzoyl) phenylphosphine oxide (Omnirad 819, manufactured by IGM Resins B.V.), and bis(2,6-dimethoxybenzoyl)-2,4,4-trimethyl pentylphosphine oxide.

The first resin composition contains only the phosphine oxide-based photopolymerization initiator as the photopolymerization initiator. In view of cutting the cost of the resin compositions, the first resin composition and the second resin composition may contain only the phosphine oxide-based photopolymerization initiator as the photopolymerization initiator.

The second resin composition may further contain an acetophenone-based photopolymerization initiator in view of improving the curability of the surface.

Examples of the acetophenone-based photopolymerization initiator include 1-hydroxycyclohexyl phenyl ketone (Omnirad 184, manufactured by IGM Resins B.V.), 2,2-dimethoxy-2-phenylacetophenone (Omnirad 651, manufactured by IGM Resins B.V.), 1-(4-isopropylphenyl)-2-hydroxy-2-methylpropan-1-one, and 2-methyl-1-[4-(methylthio)phenyl]-2-morpholinopropan-1-one (Omnirad 907, manufactured by IGM Resins B.V.).

The photopolymerizable compounds according to the present embodiment may contain an oligomer and a monomer. Examples of the oligomer include urethane (meth)acrylate and epoxy (meth)acrylate.

The urethane (meth)acrylate may be a compound obtained by reacting a polyol compound, a polyisocyanate compound and a hydroxyl group-containing (meth)acrylate compound.

Examples of the polyol compound include polytetramethylene glycol, polypropylene glycol and bisphenol A-ethylene oxide adduct diol. The number-average molecular weight (Mn) of the polyol compound may be 300 or more and 8000 or less in view of adjusting the Young's modulus of the coating resin layer. The Mn of the polyol compound configuring the urethane (meth)acrylate that the first resin composition contains may be 1200 or more and 8000 or less, 2000 or more and 7000 or less, or 3000 or more and 6000 or less in view of decreasing the Young's modulus of the primary resin layer. The Mn of the polyol compound configuring the urethane (meth)acrylate that the second resin composition contains may be 300 or more and less than 1200, 400 or more and 1100 or less, or 500 or more and 1000 or less in view of increasing the Young's modulus of the secondary resin layer.

Examples of the polyisocyanate compound include 2,4-tolylene diisocyanate, 2,6-tolylene diisocyanate, isophorone diisocyanate, and dicyclohexylmethane 4,4'-diisocyanate.

Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol (meth)acrylate.

As a catalyst for synthesizing the urethane (meth)acrylate, an organic tin compound is ordinarily used. Examples of the organic tin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. In view of the availability or the catalyst performance, it is preferable to use dibutyltin dilaurate or dibutyltin diacetate.

At the time of synthesizing the urethan (meth)acrylate, a lower alcohol having 5 or less carbon atoms may be used. Examples of the lower alcohol include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

As the epoxy (meth)acrylate, it is possible to use a compound obtained by reacting a compound having a (meth)acryloyl group with an epoxy resin having two or more glycidyl groups.

As the monomer, it is possible to use a monofunctional monomer having one polymerizable group or a multifunctional monomer having two or more polymerizable groups. Two or more kinds of monomers may be mixed and used.

Examples of the monofunctional monomer include (meth)acrylate-based monomers such as methyl (meth)acrylate, ethyl (meth)acrylate, propyl (meth)acrylate, n-butyl (meth)acrylate, s-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, 2-phenoxyethyl (meth)acrylate, 3-phenoxybenzyl acrylate, phenoxydiethyleneglycol acrylate, phenoxypolyethyleneglycol acrylate, 4-tert-butylcyclohexanol acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenol EO-modified acrylate, nonylphenoxypolyethylene glycol (meth)acrylate, and isobornyl (meth)acrylate; carboxyl group-containing monomers such as (meta)acrylic acid, (meth)acrylic acid dimer, carboxyethyl (meth)acrylate, carboxypentyl (meth)acrylate, and ω-carboxy-polycaprolactone (meth)acrylate; heterocycle-containing (meth)acrylates such as N-acryloylmorpholine, N-vinylpyrrolidone, N-vinylcaprolactam, N-acryloylpiperidin, N-methacryloylpiperidin, N-acryloylpyrrolidine, 3-(3-pyridyl)propyl (meth)acrylate, and cyclic trimethylolpropane formal acrylate; maleimide-based monomers such as maleimide, N-cyclohexyl maleimide, and N-phenylmaleimide; N-substituted amide-based monomers such as (meta)acrylamide, N,N-dimethyl (meth)acrylamide, N,N-diethyl (meth)acrylamide, N-hexyl (meth)acrylamide, N-methyl (meth)acrylamide, N-butyl (meth)acrylamide, N-butyl (meth)acrylamide, N-methylol (meth)acrylamide, and N-methylolpropane (meth)acrylamide; aminoalkyl (meth)acrylate-based monomers such as aminoethyl (meth)acrylate, aminopropyl (meth)acrylate, N,N-dimethylaminoethyl (meth)acrylate, and tert-butylaminoethyl (meth)acrylate; succinimide-based monomers such as N-(meth)acryloyloxymethylene succinimide, N-(meth)acryloyl-6-oxyhexamethylene succinimide, and N-(meth)acryloyl-8-oxyoctamethylene succinimide.

Examples of the polyfunctional monomer include ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of an alkylene oxide adduct of bisphenol A, tetraethylene glycol di(meth)acrylate, neopentyl glycol hydroxypivalate di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyldiol di(meth)acrylate, 3-ethyl-1,8-octanediol di(meth)acrylate, di(meth)acrylate of EO adduct of bisphenol A, trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxypolypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris[(meth)acryloyloxyethyl] isocyanurate.

In view of adjusting the viscosity of the resin composition to improve the coatability on to the glass fiber or optimizing the Young's modulus of the cured product, at least one of the first resin composition or the second resin composition may contain nonylphenol polyethylene glycol acrylate as the monofunctional monomer, and the first resin composition preferably contains nonylphenol polyethylene glycol acrylate. Examples of the nonylphenol polyethylene glycol acrylate include nonylphenol ethylene oxide-modified (8 mole adduct) acrylate, nonylphenol ethylene oxide-modified (1 mole adduct) acrylate, and nonylphenol ethylene oxide-modified (4 mole adduct) acrylate.

In view of suppressing the change in the removability of the coating over time, the amount of the unreacted nonylphenol polyethylene glycol acrylate in the coating resin layer may be less than 1.0 mass % and is preferably 0.95 mass % or less, more preferably 0.93 mass % or less, and still more preferably 0.90 mass % or less. The lower limit value of the amount of the unreacted nonylphenol polyethylene glycol acrylate is not particularly limited and the amount may be 0.1 mass % or more, 0.3 mass % or more, or 0.5 mass % or more.

The resin compositions may further contain a silane coupling agent, a leveling agent, a defoaming agent, an antioxidant, a sensitizer or the like.

The silane coupling agent is not particularly limited as long as the curing of the resin compositions is not hindered. Examples of the silane coupling agent include tetramethyl silicate, tetraethyl silicate, mercaptopropyltrimethoxysilane, vinyltrichlorosilane, vinyltriethoxysilane, vinyltris(β-methoxy-ethoxy)silane, β-(3,4-ep oxycycl hexyl)-ethyltrimethoxysilane, dimethoxydimethylsilane, diethoxydimethylsilane, 3-acryl oxypropyltrim ethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxy silyl)propyl] tetrasulfide, bis-[3-(triethoxysilyl)propyl] disulfide, γ-trimethoxysilylpropyl dimethylthiocarbamyl tetrasulfide, and γ-trimethoxysilylpropyl benzothiazyl tetrasulfide.

(Method for Manufacturing Optical Fiber)

A method for manufacturing an optical fiber according to the present embodiment includes an application step of applying a first resin composition and a second resin composition to the outer circumference of a glass fiber having a temperature of 80° C. or lower and a curing step of curing the resin compositions by radiating ultraviolet rays after the application step.

In the application step, the first resin composition is applied to the surface of the glass fiber 10 to form a first resin layer consisting of the first resin composition (a layer that corresponds to the primary resin layer 22 after curing) on the surface of the glass fiber 10, and the second resin composition is applied to the surface of the first resin layer to form a second resin layer consisting of the second resin composition (a layer that corresponds to the secondary resin layer 24 after curing) on the surface of the first resin layer. That is, in the application step, the first resin composition and the second resin composition are applied to the glass fiber 10 having a temperature of 80° C. or lower such that the first resin composition and the second resin composition are distant from the glass fiber 10 in this order.

When the temperature of the glass fiber is controlled in the application step, it is easy to reduce the proportion of the unreacted phosphine oxide-based photopolymerization initiator. The temperature of the glass fiber is preferably 75° C. or lower and more preferably 70° C. or lower. The lower limit value of the temperature of the glass fiber is not particularly limited and the temperature may be 30° C. or higher, 40° C. or higher or, 45° C. or higher.

In the curing step, the first resin layer and the second resin layer are cured by irradiation with ultraviolet rays, thereby forming the primary resin layer 22 from the first resin layer and forming the secondary resin layer 24 from the second resin layer.

Examples of an ultraviolet ray light source include an ultraviolet LED and an ultraviolet lamp. The wavelengths of ultraviolet rays emitted from the ultraviolet LED are, for example, in a region of 300 nm to 450 nm, and the wavelength region of ultraviolet rays emitted from the ultraviolet lamp is, for example, 200 nm to 450 nm. Since the illumination level is high, it is preferable to use the ultraviolet LED, whereby the power consumption can be reduced, and it is more preferable to use an ultraviolet LED including the wavelengths of ultraviolet rays in a region of 350 nm to 405 nm. The irradiation time of ultraviolet rays from the ultraviolet LED is, for example, $4 \times 10^{-3}$ seconds or longer and 1 second or shorter. Ultraviolet rays are radiated in, for example, an inert gas atmosphere such as a nitrogen atmosphere.

EXAMPLES

Hereinafter, the results of evaluation tests in which examples according to the present disclosure and comparative examples were used will be shown to describe the present disclosure in more detail. The present invention is not limited to these examples.

[First Resin Composition]
(Resin Composition P1)

As an oligomer, urethane acrylate a obtained by reacting polypropylene glycol having a molecular weight of 4000, 2,4-tolylene diisocyanate and hydroxyethyl acrylate was prepared. 78 Parts by mass of the urethane acrylate a, 9 parts by mass of nonylphenol polyethylene glycol acrylate (trade name "SR504" manufactured by Sartomer Company), 7 parts by mass of N-vinylcaprolactam, 5 parts by mass of 1,6-hexanediol diacrylate, and 1 part by mass of 2,4,6-trimethylbenzoyldiphenylphosphine oxide (Omnirad TPO) were mixed to prepare a resin composition P1.

[Second Resin Composition]
(Resin Composition S1)

As an oligomer, urethane acrylate b obtained by reacting polypropylene glycol having a molecular weight of 600, 2,4-tolylene diisocyanate and hydroxyethyl acrylate was prepared. 27 Parts by mass of the urethane acrylate b, 30 parts by mass of tripropylene glycol diacrylate (trade name "TPGDA" manufactured by Daicel-Allnex Ltd.), 40 parts by mass of 2-phenoxyethyl acrylate (trade name "LIGHT ACRYLATE PO-A" manufactured by Kyoeisha Chemical Co., Ltd.), 1 part by mass of TPO, and 2 parts by mass of 1-hydroxycyclohexyl phenyl ketone (Omnirad 184) were mixed to prepare a resin composition S1.

(Resin Composition S2)

29 Parts by mass of the urethane acrylate b, 30 parts by mass of TPGDA, 40 parts by mass of PO-A and 1 part by mass of TPO were mixed to prepare a resin composition S2.

[Production of Optical Fiber]

Example 1

In an application step, a first resin layer having a thickness of 32.5 μm was formed using the resin composition P1 on the outer circumference of a glass fiber having a temperature of 80° C. and a diameter of 125 μm, and furthermore, a second resin layer having a thickness of 27.5 μm was formed using the resin composition S1 on the outer circumference of the first resin layer.

In a curing step, the first layer and the second layer were cured by radiating ultraviolet rays using an ultraviolet LED (emission wavelength λ=385 nm) under a condition of an irradiation level (illumination level×irradiation time) of 29 mW/cm²·seconds, thereby producing an optical fiber having a coating resin layer consisting of a primary resin layer and a secondary resin layer.

Examples 2 to 5 and Comparative Examples 1 and 2

Optical fibers were produced in the same manner as in Example 1 except that the temperature of the glass fiber and the irradiation condition of ultraviolet rays were changed to numerical values shown in Table 1.

Example 6

In an application step, a first resin layer having a thickness of 32.5 μm was formed using the resin composition P1 on the outer circumference of a glass fiber having a temperature of 60° C. and a diameter of 125 μm, and furthermore, a second resin layer having a thickness of 27.5 μm was formed using the resin composition S2 on the outer circumference of the first resin layer.

In a curing step, the first layer and the second layer were cured by radiating ultraviolet rays having an emission wavelength of 385 nm using an ultraviolet LED under a condition of an irradiation level of 21 mW/cm²·seconds, thereby producing an optical fiber having a coating resin layer consisting of a primary resin layer and a secondary resin layer.

Examples 7 to 9 and Comparative Example 3

Optical fibers were produced in the same manner as in Example 6 except that the temperature of the glass fiber and the irradiation condition of ultraviolet rays were changed to numerical values shown in Table 2.

(Measurement of Amount Unreacted)

After 1 g of the optical fiber was immersed in acetone, unreacted TPO and nonylphenol polyethylene glycol acrylate which were extracted into the acetone were measured by GC-FPD analysis. As a column, Frontier Lab UA-1 was used.

(Removability of Coating)

An optical fiber plate was disposed at a distance of 30 cm from a 30 W fluorescent lamp and left to stand at room temperature for 14 days, and then the coating resin layer was removed from the optical fiber at 23° C. using a jacket remover "JR-6" manufactured by Sumitomo Electric Industries, Ltd. A coating residue of the resin layer remaining on the glass fiber was wiped off with KIMWIPES (manufactured by Nippon Paper Crecia Co., Ltd.) wetted with ethanol. A case where the coating residue was erased by wiping once was rated as "A", a case where the coating residue was erased by wiping two or three times was rated as "B", and a case where the coating residue was erased by wiping four or more times or not erased was rated as "C".

TABLE 1

|  | | Example 1 | Example 2 | Example 3 | Example 4 | Example 5 | Comparative Example 1 | Comparative Example 2 |
|---|---|---|---|---|---|---|---|---|
| Temperature of glass fiber (° C.) | | 50 | 60 | 70 | 70 | 80 | 90 | 90 |
| Irradiation level (mW/cm² · seconds) | | 29 | 21 | 21 | 14 | 14 | 14 | 11 |
| Amount unreacted (mass %) | TPO | 0.08 | 0.13 | 0.23 | 0.48 | 0.50 | 0.61 | 0.72 |
|  | Nonylphenol polyethylene glycol acrylate | 0.56 | 0.71 | 0.69 | 0.90 | 0.95 | 1.0 | 1.3 |
| Removability of coating | | A | A | A | A | B | C | C |

TABLE 2

|  | | Example 6 | Example 7 | Example 8 | Example 9 | Comparative Example 3 |
|---|---|---|---|---|---|---|
| Temperature of glass fiber (° C.) | | 60 | 70 | 70 | 80 | 90 |
| Irradiation level (mW/cm² · seconds) | | 21 | 21 | 14 | 14 | 14 |
| Amount unreacted (mass %) | TPO | 0.21 | 0.29 | 0.44 | 0.50 | 0.79 |
|  | Nonylphenol polyethylene glycol acrylate | 0.67 | 0.75 | 0.90 | 0.99 | 1.1 |
| Removability of coating | | A | A | A | B | C |

REFERENCE SIGNS LIST

1 Optical fiber
10 Glass fiber
20 Coating resin layer
22 Primary resin layer
24 Secondary resin layer

The invention claimed is:

1. An optical fiber comprising:
a glass fiber including a core and a cladding; and
a coating resin layer coating the glass fiber in contact with the glass fiber,
wherein the coating resin layer has a primary resin layer coating the glass fiber in contact with the glass fiber and a secondary resin layer coating the primary resin layer,
the primary resin layer comprises a cured product of a first resin composition containing a photopolymerizable compound and a phosphine oxide-based photopolymerization initiator,
the secondary resin layer comprises a cured product of a second resin composition containing a photopolymerizable compound and a phosphine oxide-based photopolymerization initiator,
an amount of the phosphine oxide-based photopolymerization initiator remaining unreacted in the coating resin layer is 0.5 mass % or less, and
the first resin composition and the second resin composition do not contain any photopolymerization initiators other than the phosphine oxide-based photopolymerization initiator.

2. A method for manufacturing the optical fiber according to claim 1, the method comprising:
an application step of applying the first resin composition and the second resin composition to a glass fiber having a temperature of 80° C. or lower such that the first resin composition and the second resin composition are distant from the glass fiber in this order; and
a curing step of curing the resin compositions by radiating ultraviolet rays after the application step.

3. The method for manufacturing the optical fiber according to claim 2, wherein ultraviolet rays emitted by an ultraviolet light emitting diode are radiated in the curing step.

4. The method for manufacturing the optical fiber according to claim 3, wherein wavelengths of the ultraviolet rays are within a region of 350 nm to 405 nm.

5. An optical fiber comprising:
a glass fiber including a core and a cladding; and
a coating resin layer coating the glass fiber in contact with the glass fiber,
wherein the coating resin layer has a primary resin layer coating the glass fiber in contact with the glass fiber and a secondary resin layer coating the primary resin layer, the primary resin layer comprises a cured product of a first resin composition containing a photopolymerizable compound and a phosphine oxide-based photopolymerization initiator, the secondary resin layer comprises a cured product of a second resin composition containing a photopolymerizable compound and a phosphine oxide-based photopolymerization initiator, and an amount of the phosphine oxide-based photopolymerization initiator remaining unreacted in the coating resin layer is 0.5 mass % or less, and wherein at least one of the first resin composition or the second resin composition contains nonylphenol polyethylene glycol acrylate as the photopolymerizable compound, and an amount of the nonylphenol polyethylene glycol acrylate remaining unreacted in the coating resin layer is less than 1.0 mass %.

6. The optical fiber according to claim 5, wherein the second resin composition further contains an acetophenone-based photopolymerization initiator.

7. A method for manufacturing the optical fiber according to claim 5, the method comprising:
   an application step of applying the first resin composition and the second resin composition to a glass fiber having a temperature of 80° C. or lower such that the first resin composition and the second resin composition are distant from the glass fiber in this order; and
   a curing step of curing the resin compositions by radiating ultraviolet rays after the application step.

8. The method for manufacturing the optical fiber according to claim 7, wherein ultraviolet rays emitted by an ultraviolet light emitting diode are radiated in the curing step.

9. The method for manufacturing the optical fiber according to claim 7, wherein wavelengths of the ultraviolet rays are within a region of 350 nm to 405 nm.

* * * * *